(12) United States Patent
Sugimoto (10) Patent No.: US 11,015,567 B2
(45) Date of Patent: May 25, 2021

(54) WARM-UP SYSTEM FOR VEHICLE

(71) Applicant: TOYOTA JIDOSHA KABUSHIKI KAISHA, Toyota (JP)

(72) Inventor: Kazuhiro Sugimoto, Ashigarakami-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 42 days.

(21) Appl. No.: 16/291,294

(22) Filed: Mar. 4, 2019

(65) Prior Publication Data
US 2019/0331081 A1  Oct. 31, 2019

(30) Foreign Application Priority Data

Apr. 25, 2018 (JP) .............................. JP2018-084188

(51) Int. Cl.
*F02N 19/04* (2010.01)
*F24V 30/00* (2018.01)
*B60H 1/22* (2006.01)

(52) U.S. Cl.
CPC .............. *F02N 19/04* (2013.01); *F24V 30/00* (2018.05); *B60H 2001/2228* (2013.01); *B60H 2001/2256* (2013.01)

(58) Field of Classification Search
CPC . F02N 19/04; F24V 30/00; B60H 2001/2228; B60H 2001/2256
USPC ...................................................... 123/179.21
See application file for complete search history.

(56) References Cited

U.S. PATENT DOCUMENTS

| | | | | |
|---|---|---|---|---|
| 3,973,552 | A * | 8/1976 | Ervin, Jr. | ............... F24S 90/00 126/619 |
| 4,318,369 | A * | 3/1982 | Cronyn | ................... F02B 43/10 123/3 |
| 5,653,106 | A * | 8/1997 | Katashiba | ........... F28D 20/0034 60/300 |

(Continued)

FOREIGN PATENT DOCUMENTS

| JP | 2009-275518 A | 11/2009 |
|---|---|---|
| JP | 2014-136974 A | 7/2014 |
| JP | 2015-094260 A | 5/2015 |

OTHER PUBLICATIONS

Tsuyoshi Totani. "Heat Storage Material Capable of Heat Release Control: A Heat Storage Material Which Releases Heat With a Rise in Temperature". New Technology Presentation Meetings, Japan Science and Technology Agency, Dec. 7, 2017.

*Primary Examiner* — David Hamaoui
*Assistant Examiner* — John D Bailey
(74) *Attorney, Agent, or Firm* — Oliff PLC (57) ABSTRACT

AMP (2-Amino-2-Methyl-1, 3-Propanediol) does not release the absorbed heat during temperature drop but releases it during temperature rise. Also, AMP keeps a solid state upon the heat release. The heat storage material which is the aggregate of AMP is arranged to exchange heat with the subject for warm-up. In the warm-up acceleration control, it is judged whether or not there is a request for warm-up to the subject for warm-up (step S10). If it is judged that there is the request for warm-up, it is judged whether or not the radiation condition of the heat storage material is satisfied (step S12). If it is judged that the radiation condition is satisfied, the heater is started to operate (step S14). By operating the heater, the heat storage material is directly or indirectly heated.

9 Claims, 10 Drawing Sheets

(56) References Cited

U.S. PATENT DOCUMENTS

| | | | | |
|---|---|---|---|---|
| 6,817,408 B2* | 11/2004 | Lines | .................... | F25B 25/005 |
| | | | | 165/231 |
| 7,921,640 B2* | 4/2011 | Major | ..................... | F01N 5/025 |
| | | | | 60/320 |
| 8,951,475 B2* | 2/2015 | Komaki | ................ | F28D 20/003 |
| | | | | 422/111 |
| 2003/0196430 A1* | 10/2003 | Brown | .................... | C10L 10/02 |
| | | | | 60/297 |
| 2007/0000484 A1* | 1/2007 | Magill | .................... | F24V 30/00 |
| | | | | 126/263.02 |
| 2007/0004591 A1* | 1/2007 | Itabashi | ................ | B01J 20/186 |
| | | | | 502/414 |
| 2009/0236435 A1* | 9/2009 | Kudo | .................... | F28D 20/021 |
| | | | | 237/12.3 B |
| 2010/0186685 A1* | 7/2010 | Hiyama | ............. | B60H 1/00492 |
| | | | | 123/41.08 |
| 2012/0055425 A1* | 3/2012 | Mueller | ................... | F01P 11/20 |
| | | | | 123/41.55 |
| 2014/0047853 A1* | 2/2014 | Zhong | ..................... | B60H 1/14 |
| | | | | 62/106 |
| 2014/0374058 A1* | 12/2014 | Greiner | ............. | B60H 1/00492 |
| | | | | 165/52 |
| 2017/0145980 A1* | 5/2017 | Gu | .......................... | F01N 13/14 |
| 2017/0210196 A1* | 7/2017 | Bidner | ................... | B60H 1/004 |
| 2018/0023453 A1* | 1/2018 | Okamura | ............... | F01P 7/167 |
| | | | | 123/142.5 E |
| 2018/0058769 A1* | 3/2018 | Bidner | ................... | F28F 27/00 |
| 2018/0156143 A1* | 6/2018 | Hussain | ............. | F02D 41/0077 |

\* cited by examiner

S10 IS THERE REQUEST FOR WARM-UP TO SUBJECT FOR WARM-UP?
S12 IS RADIATION CONDITION C1 SATISFIED?
S14 HEATER IS STARTED TO OPERATE
S16 THSM>TR1+A?
S18 OPERATION OF HEATER IS STOPPED

S20 IS THERE REQUEST FOR WARM-UP TO SUBJECT FOR WARM-UP?
S22 IS RADIATION CONDITION C2 SATISFIED?
S24 HEATER IS STARTED TO OPERATE
S26 THSM>TRX+A?
S28 OPERATION OF HEATER IS STOPPED

S30 IS THERE REQUEST FOR OPERATION STOP TO SUBJECT FOR WARM-UP?
S32 IS ABSORPTION CONDITION SATISFIED?
S34 HEATER IS STARTED TO OPERATE
S36 THSM>TA?
S38 OPERATION OF HEATER IS STOPPED

*FIG. 13*

WARM-UP SYSTEM FOR VEHICLE

CROSS-REFERENCE TO RELATED APPLICATION

The present disclosure claims priority under 35 U.S.C. § 119 to Japanese Patent Application No. 2018-084188, filed on Apr. 25, 2018. The content of the application is incorporated herein by reference.

TECHNICAL FIELD

The present disclosure relates to a system for warming up various devices mounted on a vehicle.

BACKGROUND

Patent Literature 1 discloses a warm-up system for vehicle utilizing properties of sodium acetate (NaOAc). When NaOAc is cooled down from a liquid state, it does not solidify below its freezing point (60° C.) but becomes a supercooling state. When physical stimuli is given to NaOAc in the supercooling state, it starts to coagulate and releases heat.

The system mentioned above performs warm-up acceleration control at engine start. In the warm-up acceleration control, it is judged whether NaOAc is coagulated or not. Then, when it is judged that NaOAc is not coagulated, coagulation operation of NaOAc is started to execute. According to the warm-up acceleration control, it is possible to warm up the engine by releasing heat from NaOAc in the supercooling state.

Non-Patent Literature 1 discloses new properties of 2-Amino-2-Methyl-1, 3-Propanediol (AMP). Like other heat storage materials, AMP absorbs heat and releases the absorbed heat in a given temperature range. The new properties relates to heat release. Specifically, AMP does not release the absorbed heat during temperature drop but releases it during temperature rise. Also, AMP keeps a solid state upon the heat release.

The applicant is aware of the following literatures, as literatures related to the present disclosure.
Patent Literature 1: JP2015-094260A
Non-Patent Literature 1: Tsuyoshi Totani, "Heat storage material capable of heat release control: A heat storage material which releases heat with a rise in temperature", Dec. 7, 2017, New technology Presentation Meeting, Japan Science and Technology Agency However, in order to realize the supercooling state of NaOAc, it is necessary for NaOAc to be in the liquid state at the engine start. However, this liquid state is not realized unless temperature of NaOAc at the engine start is higher than the freezing point (i.e., 60° C.). Therefore, when the temperature of NaOAc is lower than the freezing point, NaOAc must be heated separately. Further, in order to realize the supercooling state, NaOAc in the liquid state have to be cooled during the warm-up of the engine. Therefore, the above warm-up acceleration control is not realistic nor efficient.

In this regard, the heat release of AMP disclosed in Non-Patent Document 1 is realized in a relatively low temperature range. Therefore, to utilize the properties of AMP is effective means for the warm-up of the engine. However, Non-patent document 1 does not make detailed reference on how to apply the properties of AMP to warm-up system for vehicle.

The present disclosure addresses the above described problem, and an object of the present disclosure is, to provide a new warm-up system for vehicle in which the properties of AMP is effectively utilized.

SUMMARY

A first aspect of the present disclosure is a warm-up system for vehicle to solve the problem described above and has the following features.

The warm-up system for vehicle includes a heat storage material, a heater, a temperature sensor, and a controller.

The heat storage material is arranged to exchange heat with a subject for warm-up mounted on a vehicle.

The heater is arranged to heat the heat storage material.

The temperature sensor is configured to detect temperature of the heat storage material.

The controller is configured to control operation of the heater.

The heat storage material has properties that absorbs heat when its temperature exceeds a preset absorption temperature, releases the absorbed heat when its temperature rises, and keeps a solid state upon the heat absorption and release.

The controller is further configured to judge, when there is a request for warm-up to the subject for warm-up, whether or not the heat storage material is in a heat release state.

Whether or not the heat storage material is in the heat release state is judged based on temperature history and current temperature of the heat storage material.

The controller is further configured to operate the heater when it is judged that the heat storage material is in the heat release state.

A second aspect of the present disclosure has the following features according to the first aspect.

The controller is further configured to not operate the heater when it is judged that the heat storage material is not in the heat release state.

A third aspect of the present disclosure has the following features according to the first aspect.

The controller is further configured to stop the operation of the heater after the start of the operation.

The stop of the operation is executed when the detected temperature rises higher than a radiation temperature at which the absorbed heat is started to release, and also lower than a target warm-up temperature of the subject for warm-up.

A fourth aspect of the present disclosure has the following features according to the first aspect.

The heat storage material further has properties that its radiation temperature at which the absorbed heat is started to release increases as its particulate size enlarges.

The heat storage material includes a plurality of heat storage materials having different particulate sizes.

The controller is further configured to:
upon the judgement whether or not the heat storage material is in the heat release state, select the radiation temperature which is higher than the detected temperature and also has smallest in temperature difference with the detected temperature from candidates of the radiation temperatures which are preset in accordance with the particulate sizes; and
when it is judged that the heat storage material is in the heat release state, operate the heater until the detected temperature exceeds the selected radiation temperature.

A fifth aspect of the present disclosure has the following features according to the first aspect.

The controller is further configured to judge that the heat storage material is in the heat release state when a preset radiation condition is satisfied.

The radiation condition includes an absorption condition which is satisfied when temperature data exceeding the absorption temperature is included in history of the detected temperature.

The controller is further configured to:

when there is a request for operation stop to the subject for warm-up, judge whether or not the absorption condition is satisfied based on the history of the detected temperature; and when it is judged that the absorption condition is not satisfied, operate the heater until the detected temperature exceeds the absorption temperature.

A sixth aspect of the present disclosure has the following features according to the first aspect.

The heat storage material includes 2-Amino-2-Methyl-1, 3-Propanediol.

According to the first aspect, when it is judged that the heat storage material is in the heat release state, the heater is operated. When the heater is operated, it is possible to raise temperature of the heat storage material and then release heat therefrom. Therefore, upon the request for warm-up to the subject for warm-up, it is possible to warm up the subject quickly with the released heat.

According to the second aspect, when it is judged that the heat storage material is not in the heat release state, the heater is not operated. In other words, when it is judged that the heat storage material is unable to utilize, the heater will not be operated. Therefore, it is possible to avoid unnecessary operation of the heater.

According to the third aspect, the operation of the heater is stopped when the detected temperature rises higher than the radiation temperature and also lower than the target warm-up temperature. Therefore, it is possible to suppress energy consumption due to the heater operation as compared with the case where the heater operation is continued to execute until the detected temperature rises higher than the target warm-up temperature as well as the radiation temperature.

The heat storage material has properties that its radiation temperature rises as its particulate size enlarges. Therefore, if the temperature of the heat storage material is between the radiation temperature of the heat storage material with small particulate size and that with large particulate size, it is possible to raise the temperature of the heat storage material with large particulate size and heat is taken out therefrom. The fourth aspect focuses on this point. According to the fourth aspect, the radiation temperature which is higher than the detected temperature and also has smallest in temperature difference with the detected temperature is selected from candidates of the radiation temperatures which are preset in accordance with the particulate sizes. And when it is judged that the heat storage material is in the heat release state, the heater is operated until the detected temperature exceeds the selected radiation temperature. Therefore, it is possible to take heat from the heat storage material whose radiation temperature is higher than the detected temperature.

When the radiation condition is satisfied, it is judged that the heat storage material is in the heat release state. The radiation condition includes the absorption condition which is satisfied when temperature data exceeding the absorption temperature is included in history of the detected temperature. Therefore, if the absorption condition is not satisfied, then the radiation condition will not satisfied. In this respect, according to the fifth aspect, when there is a request for operation stop to the subject for warm-up, and it is judged that the absorption condition is not satisfied, the heater is operated until the detected temperature exceeds the absorption temperature. Therefore, it is possible to record temperature data exceeding the absorption temperature on the history of the detected temperature every time there is the request for operation stop. Therefore, it is possible to increase possibility of satisfying the absorption and radiation conditions.

According to the sixth aspect, it is possible to provide the new warm-up system for vehicle in which the properties of AMP is effectively utilized.

DESCRIPTION OF EMBODIMENT

Hereinafter, embodiments of the present disclosure will be described based on the accompanying drawings. Note that elements that are common to the respective drawings are denoted by the same reference characters and a duplicate description thereof are omitted. Further, the present disclosure is not limited to the embodiments described hereinafter.

First Embodiment

Figure 1:
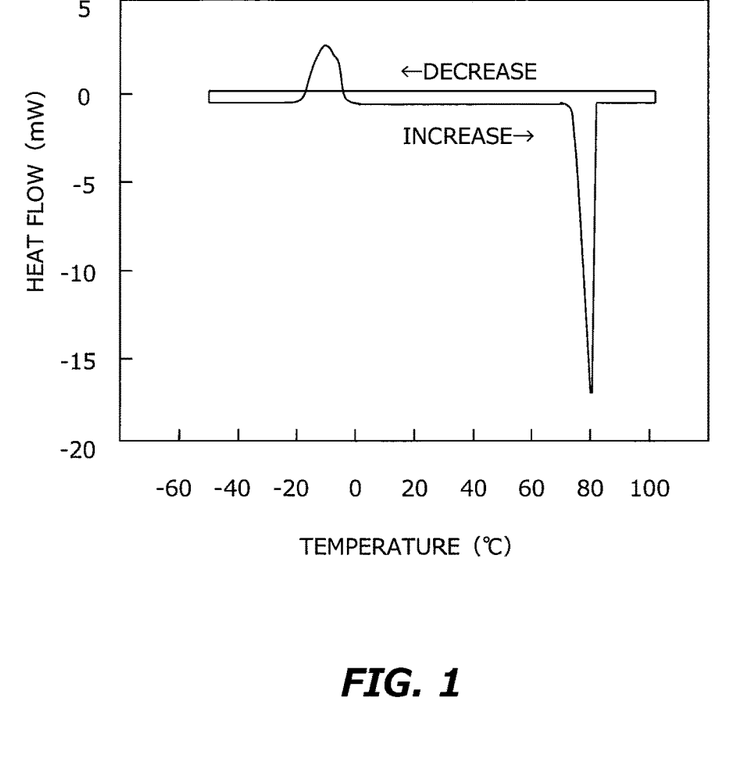
FIG. 1 is a diagram for describing properties of AMP.

First, a first embodiment will be described with reference to FIGS. 1 to 8.
1. Properties of AMP AMP is a chemical substance that is in the solid state at room temperature. AMP is also a widely available reagent. FIG. 1 is a diagram for describing properties of AMP. As shown in FIG. 1, AMP absorbs and releases heat in a range from about −40° C. to about 100° C. Heat is absorbed in a temperature range around 80° C. Heat is released in a temperature range around −10° C. The released heat is considered to be part of the heat absorbed in the temperature range around 80° C.

The heat absorption and release occur only when the temperature of the AMP rises. In other words, the heat absorption and release does not occur when the temperature of the AMP decreases. The melting point of AMP is about 170° C. Therefore, the heat absorption and release occur whereas AMP is still in the solid state.

Figure 2:
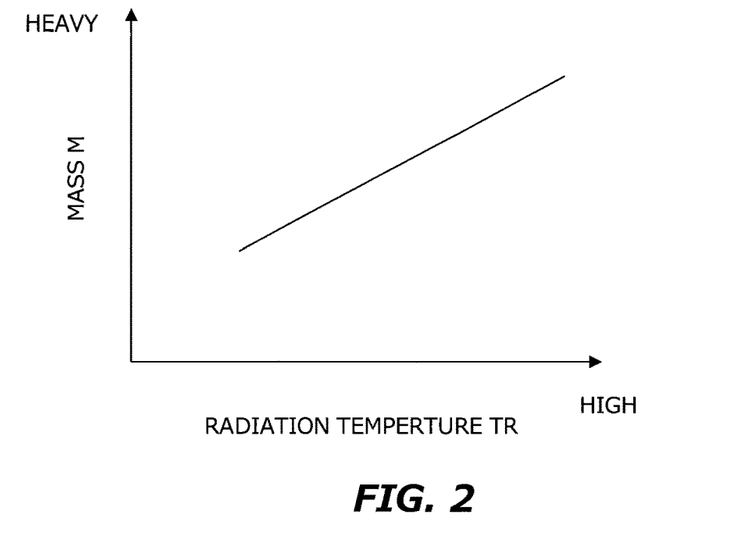
FIG. 2 is a diagram for showing relationship between a radiation temperature TR and mass M of AMP.

FIG. 2 is a diagram for showing relationship between a radiation temperature TR and mass M of AMP. The radiation temperature TR means temperature at which heat from AMP is started to release. The mass M means mass of an aggregate of AMP. As shown in FIG. 2, the radiation temperature TR rises as the mass M increases. Note that the mass M is roughly proportional to particulate size PS of AMP. Therefore, the relationship shown in FIG. 2 is able to be replaced by relationship between the radiation temperature TR and particle diameter. Note that the particulate size PS means the diameter of the aggregate of AMP.

In the example shown in FIG. 1, heat from AMP is started to release around −20° C. and is ended around 0° C. However, based on the relationship shown in FIG. 2, it can be understood that by adjusting the mass M (or the particulate size PS), temperature range within which heat is released rises. The warm-up system for vehicle according to the first embodiment utilizes such the properties of AMP. In the following description, the aggregate of AMP is also called as a "heat storage material".

2. Description of Warm-Up System for Vehicle

Figure 3:
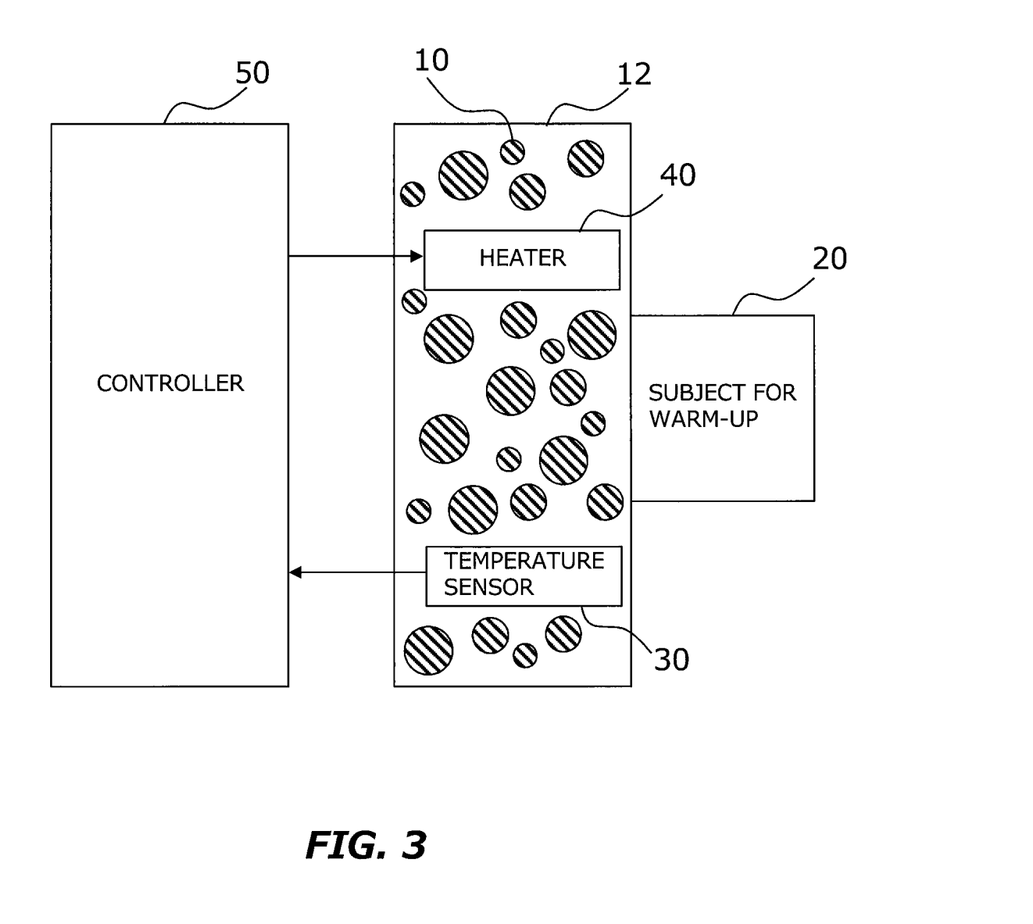
FIG. 3 is a diagram for describing a first configuration example of a warm-up system for vehicle of a first embodiment of the present disclosure.

FIG. 3 is a diagram for describing a first configuration example of the warm-up system for vehicle of the first embodiment. The system shown in FIG. 3 includes heat storage materials 10, a base material 12, a subject for warm-up 20, a temperature sensor 30, a heater 40 and a controller 50.

The base material 12 is made of resin, metal, or the like. In the base material 12, multiple heat storage materials 10 with different particulate sizes are carried in a dispersed state. To the base material 12, the subject for warm-up 20 is thermally connected. In other words, the base material 12 and the subject for warm-up 20 are connected to each other such that heat is exchanged therebetween. The subject for warm-up 20 includes a battery, an engine main body and an exhaust catalyst. The temperature sensor 30 detects temperature of the base material 12 (i.e., temperature of the heat storage materials 10) and transmits it to the controller 50. The heater 40 heats the base material 12 based on a command from the controller 50.

Figure 4:
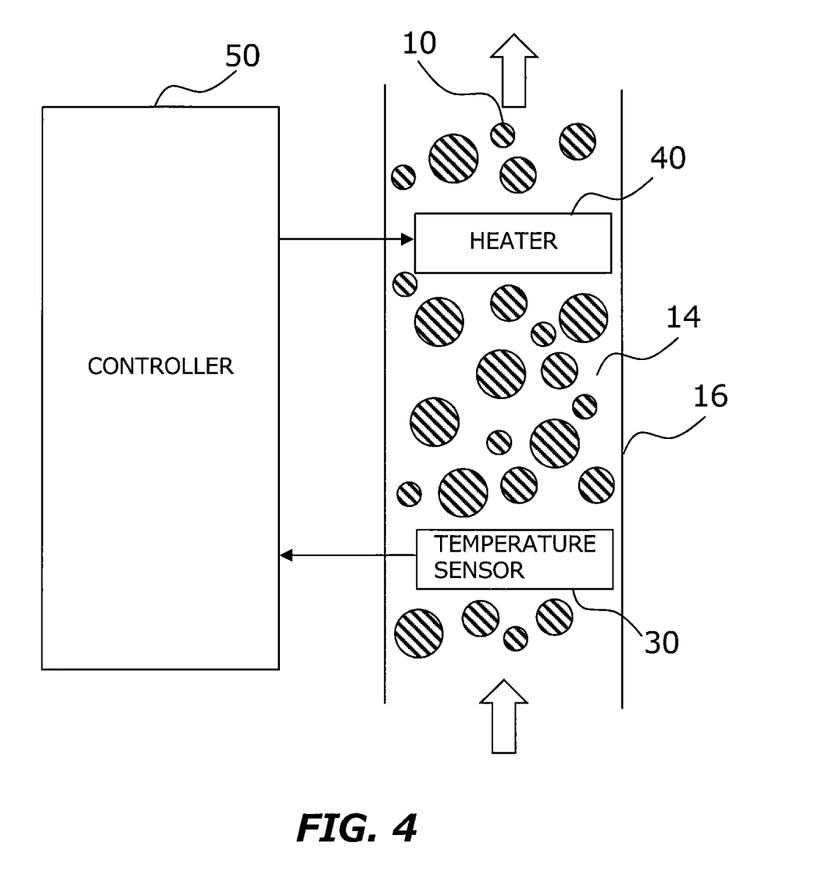
FIG. 4 is a diagram for describing a second configuration example of the warm-up system for vehicle of the first embodiment.

FIG. 4 is a diagram for describing a second configuration example of the warm-up system for vehicle of the first embodiment. The system shown in FIG. 4 includes a delivery pipe 16 through which the heat storage materials 10 and cooling medium 14 flow, the temperature sensor 30, the heater 40 and the controller 50. Note that the systems shown in FIGS. 3 and 4 have common points where multiple heat storage materials 10 with different particle sizes, the temperature sensor 30, the heater 40 and the controller 50 are provided.

The cooling medium 14 is liquid to transport the heat storage materials 10. The cooling medium 14 is a liquid with a low affinity for AMP. According to the liquid with low affinity, the heat storage materials 10 is able to be transported in the solid state. If the cooling medium 14 is coolant of the engine, then an engine water jacket corresponds to the delivery pipe 16. In other words, the subject for warm-up (not shown) in this case is the engine main body. The temperature sensor 30 detects temperature of the cooling medium 14 (i.e., temperature of the heat storage materials 10) and transmits it to the controller 50.

3. Description of Warm-Up Acceleration Control (Radiation Acceleration Control)

The controller 50 is typically a microcomputer including a processor, a memory and an input and output interface. In the memory, control program for warming up the subject for warm-up is stored. The temperature of the base material 12 or the cooling medium 14 detected by the temperature sensor 30 is also recorded in the memory. The detected temperature is recorded in a data format combined with detecting time thereof. The processor executes warm-up acceleration control based on the control program and history of the detected temperature.

Figure 5:
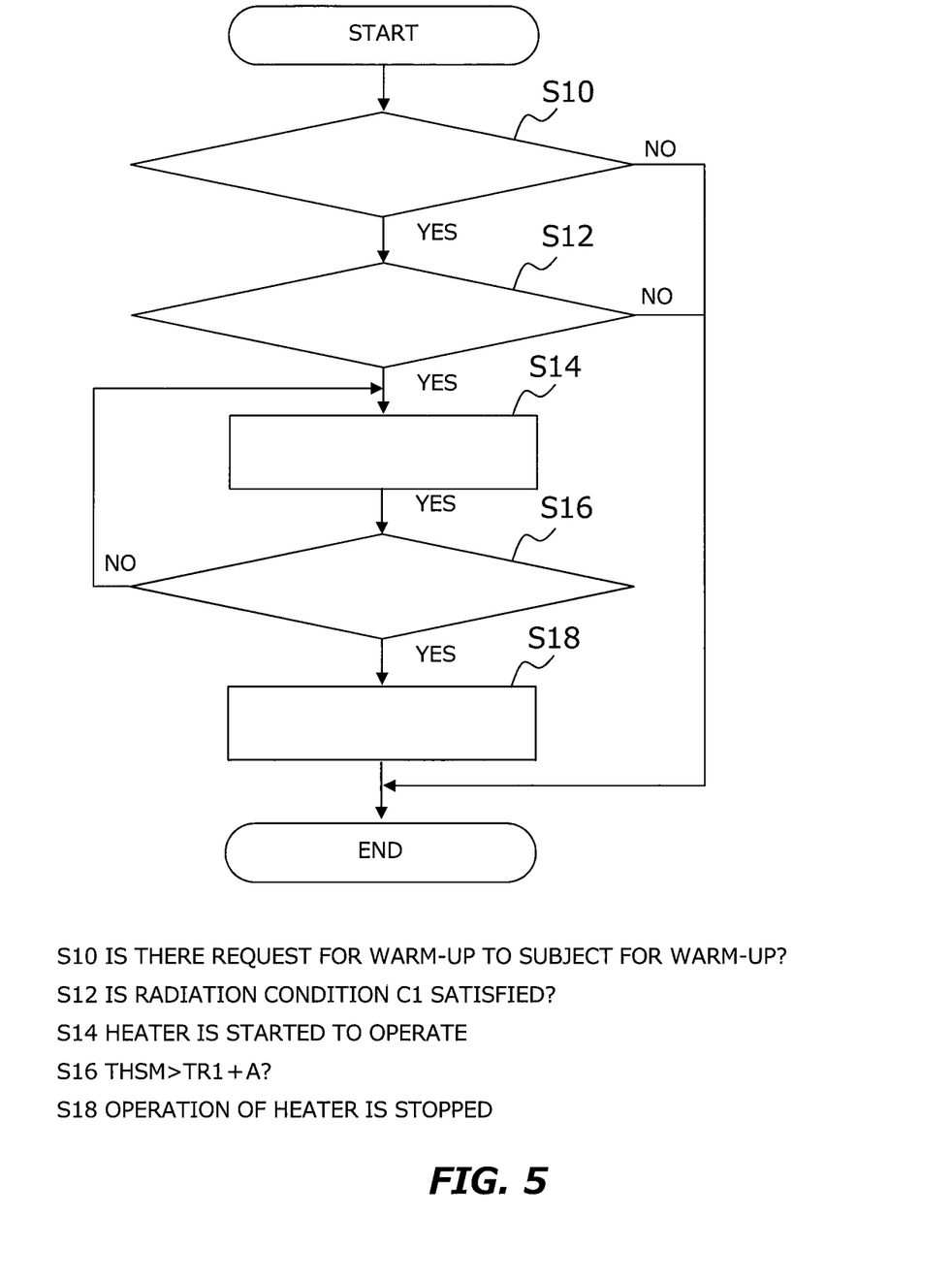
FIG. 5 is a flow chart for describing processing flow of the warm-up acceleration control executed by a controller in the first embodiment.

FIG. 5 is a flowchart for describing processing flow of the warm-up acceleration control executed by the controller 50 in the first embodiment. The processing routine shown in FIG. 5 is executed repeatedly at a predetermined control cycle while the controller 50 is at work.

In the routine shown in FIG. 5, first, it is judged whether or not there is a request for warm-up to the subject for warm-up (step S10). Whether or not there is the request for warm-up is judged based on current temperature of the subject for warm-up 20 or the cooling medium 14. If it is judged that there is no request for warm-up, the processing routine is ended.

If it is judged in the step S10 that there is the request for warm-up, it is judged whether or not a radiation condition C1 is satisfied (step S12). The radiation condition C1 is a condition for judging whether or not at least one of the heat storage materials 10 is in a heat release state. As the radiation condition C1, the following three conditions are included.

Condition C11: at current time, temperature THSM of the heat storage materials 10 is lower than a radiation temperature TR1

Figure 6:
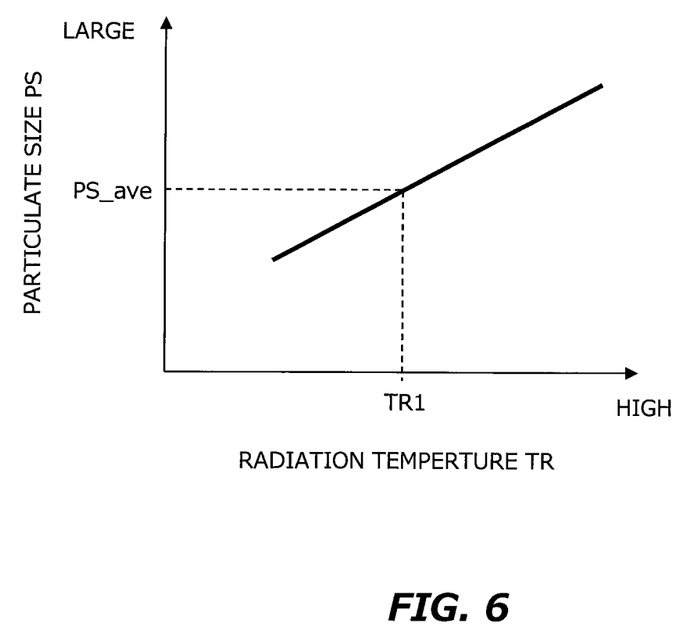
FIG. 6 is a view for describing an example of a radiation temperature TR1.

Condition C12: the temperature THSM has raised above an absorption temperature TA in the most recent past backtracking from current time Condition C13: when the condition C12 is satisfied, the temperature THSM did not raise to cross the radiation temperature TR1 from the time at which the temperature THSM raised above the absorption temperature TA to current time FIG. 6 is a diagram for describing an example of the radiation temperature TR1. As shown in FIG. 6, the radiation temperature TR1 is set to an average PS_ave of the particulate sizes. Note that, as described with reference to FIG. 2, the radiation temperature TR rises in accordance with the particulate size PS.

Figure 7:
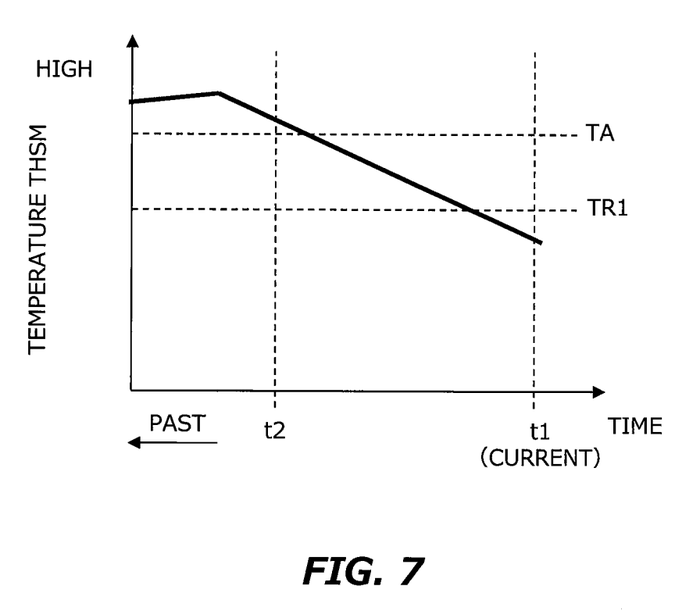
FIG. 7 is a diagram showing an example of a history of temperature THSM when radiation conditions are satisfied.

FIG. 7 is a diagram for showing an example of history of the temperature THSM when all the conditions C11 to C13 are satisfied. In the example shown in FIG. 7, the temperature THSM is lower than the radiation temperature TR1 at current time t1. Therefore, the condition C11 is satisfied. Also, the temperature THSM has raised above the absorption temperature TA at the latest time t2 back from time t1. Therefore, the condition C12 is also satisfied. Furthermore, there is no rise in the temperature THSM across the radiation temperature TR1 from time t2 to t1. Therefore, the condition C13 is also satisfied.

If it is judged in the step S12 of FIG. 5 that the radiation condition C1 is satisfied, the heater 40 is started to operate (step S14). By operating the heater 40, the heat storage materials 10 are directly or indirectly heated. When the temperature THSM reaches the radiation temperature TR1, heat from the heat storage materials 10 is started to release.

Subsequent to the step S14, it is judged whether or not the temperature THSM is higher than the temperature (TR1+α) (step S16). The temperature a is a preset value (e.g., 5° C.). When the temperature THSM is higher than the temperature (TR1+α), it is estimated that heat from the heat storage materials 10 is started to release. Therefore, in this case, the operation of the heater 40 is stopped (step S18). Otherwise, the processing of the step S14 is executed to operate the heater 40.

4. Advantageous Effect by Warm-Up Acceleration Control

Figure 8:
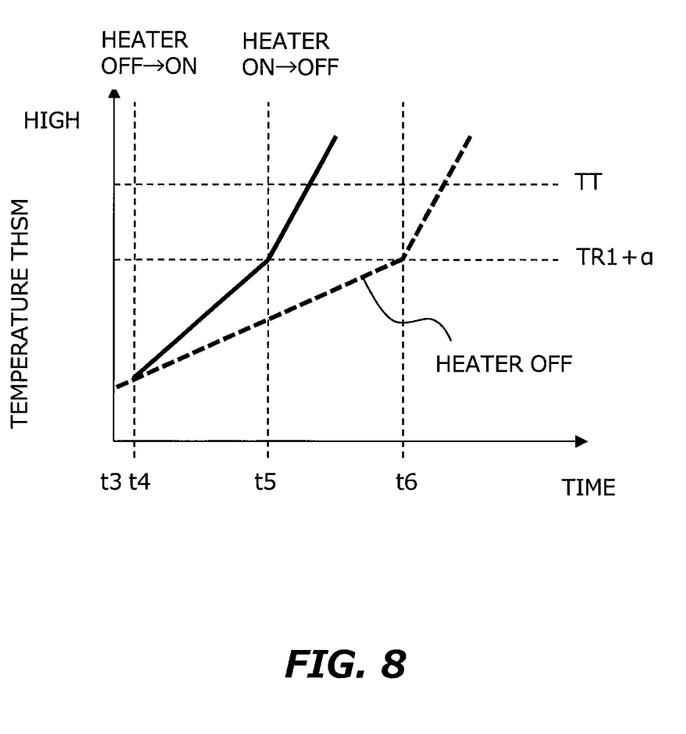
FIG. 8 is a diagram for describing advantage effects of the warm-up acceleration control executed in the first embodiment.

FIG. 8 is a diagram for describing advantageous effects by warm-up acceleration control of the first embodiment. In FIG. 8, it is assumed that the request for warm-up was issued at time t3, and the radiation condition C1 was satisfied at time t4. The solid line in FIG. 8 shows change in the temperature THSM when the warm-up acceleration control is executed. As indicated by this solid line, according to the warm-up acceleration control, the heater 40 is the operated from time t4 to t5. Therefore, it is possible to raise the temperature THSM in a short time. Then, after the time t5, by utilizing the heat released from the heat storage materials 10, it is possible to raise the temperature of the subject for warm-up to a target warm-up temperature TT.

The broken line in FIG. 8 shows change in the temperature THSM when the warm-up acceleration control is not executed. As indicated by this broken line, the temperature THSM rises even when the heater 40 is not operated. However, in this case, it is difficult to predict period between time t3 (or time t4) and time t6. Also, in this case, there is a possibility that the temperature of the subject for warm-up reaches the target warm-up temperature TT before the time t6. Then, heat released from heat storage materials 10 after the time t6 will be wasted.

In this regard, according to the warm-up acceleration control, the heater 40 is started to operate from the time t4. Therefore, after the time t4, it is possible to raise the temperature of the heat storage materials 10 largely to reach the temperature TR in a short time. Therefore, it is possible to apply the heat released from heat storage materials 10 to the subject for warm-up effectively. Further, according to the warm-up acceleration control, the heater 40 is stopped to operate after the time t5. Therefore, it is possible to minimize electricity consumption accompanying the operation of the heater 40. From the above, it is possible to warm up the subject for warm-up efficiently with the minimum amount of the electricity consumption.

Second Embodiment

Next, a second embodiment of the present disclosure will be described with reference to FIGS. 9 to 12. The configuration of the system according to the second embodiment is common to that of the system described in the first embodiment. Therefore, the configuration example of the system will be omitted to describe.

1. Description of Warm-Up Acceleration Control

As described above, in the first embodiment, it is judged that the radiation condition C1 is not satisfied when the condition C11 (i.e., the temperature THSM at the judgement processing in the step S12 is lower than the radiation temperature TR1) is not satisfied. If the radiation condition C1 is not satisfied, the warm-up acceleration control is not executed. In other words, when the condition C11 is not satisfied, even if the conditions C12 and C13 are satisfied, the warm-up acceleration control is never executed.

Figure 9:
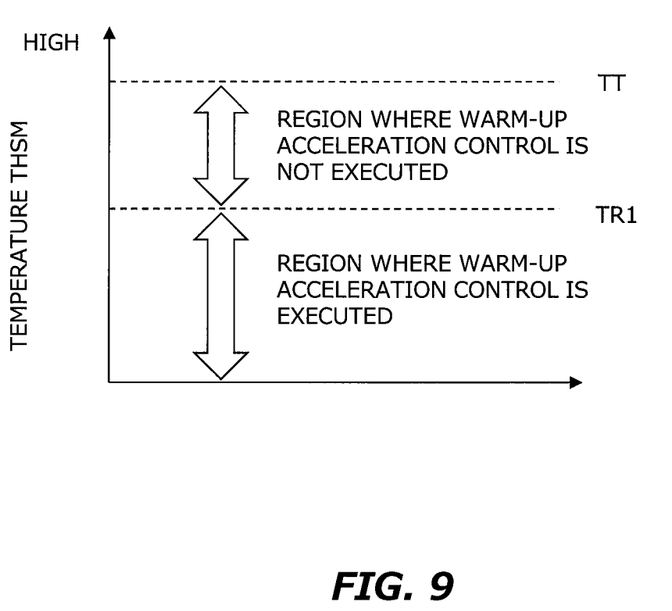
FIG. 9 is a diagram for describing a problem of the warm-up acceleration control executed in the first embodiment.

FIG. 9 is a diagram for describing an execution region of the warm-up acceleration control when focusing only on the condition C11. The vertical axis of FIG. 9 represents the temperature THSM (hereinafter also referred to as "temperature THSM_D") at the judgement processing of the radiation condition. As shown in FIG. 9, when temperature THSM_D is lower than the radiation temperature TR1, the warm-up acceleration control is executed. On the other hand, when the temperature THSM_D is higher than the radiation temperature TR1, the warm-up acceleration control is not executed.

However, as described with reference to FIG. 6, the radiation temperature TR1 was set to the average PS_ave of the particulate sizes. In addition, as described with reference to FIG. 2, the radiation temperature TR rises as the particulate size PS increases. Therefore, when the warm-up acceleration control is not executed under a condition where the condition C11 is not satisfied, opportunities to radiate the heat storage materials 10 having larger particulate size than the average PS_ave will be reduced.

Figure 10:
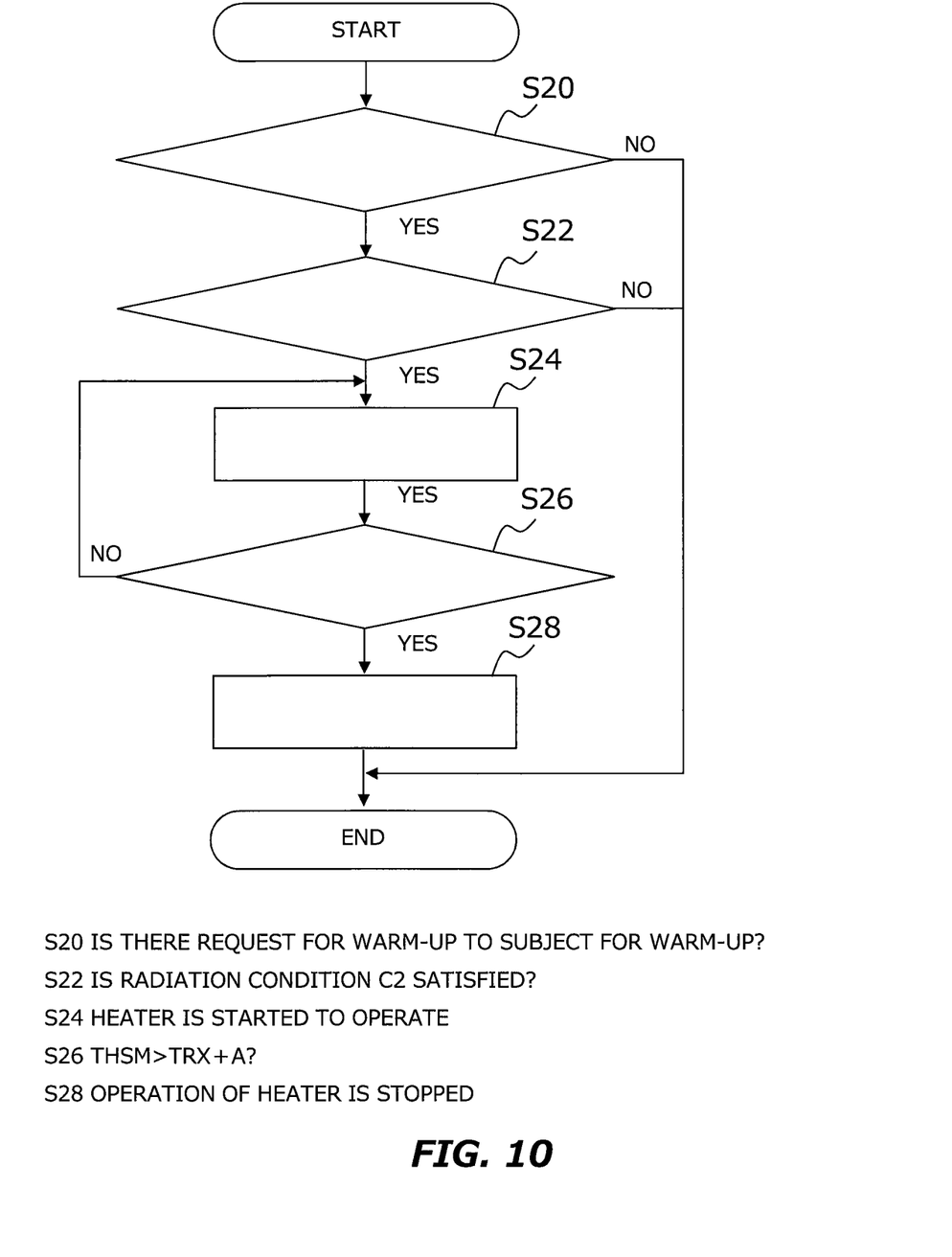
FIG. 10 is a flowchart for describing processing flow of the warm-up acceleration control executed by the controller in a second embodiment of the present disclosure.

In view of such a problem, the warm-up acceleration control of the second embodiment uses a radiation condition C2 which is different from radiation condition C1 used in the warm-up acceleration control of the first embodiment. FIG. 10 is a flowchart for describing processing flow of the warm-up acceleration control executed by the controller 50 in the second embodiment. The processing routine shown in FIG. 10 is executed repeatedly at a predetermined control cycle during the controller 50 is at work.

In the routine shown in FIG. 10, first, it is judged whether or not there is the request for warm-up to the subject for warm-up (step S20). The judgement processing of the step S20 is the same as that of the step S10 of FIG. 1.

If it is judged in the step S20 that there is the request for warm-up, it is judged whether or not the radiation condition C2 is satisfied (step S22). Like the radiation condition C1, the radiation condition C2 is a condition for judging whether or not the heat storage materials 10 is in the heat release state. As the radiation condition C2, the following three conditions are included.

Figure 11:
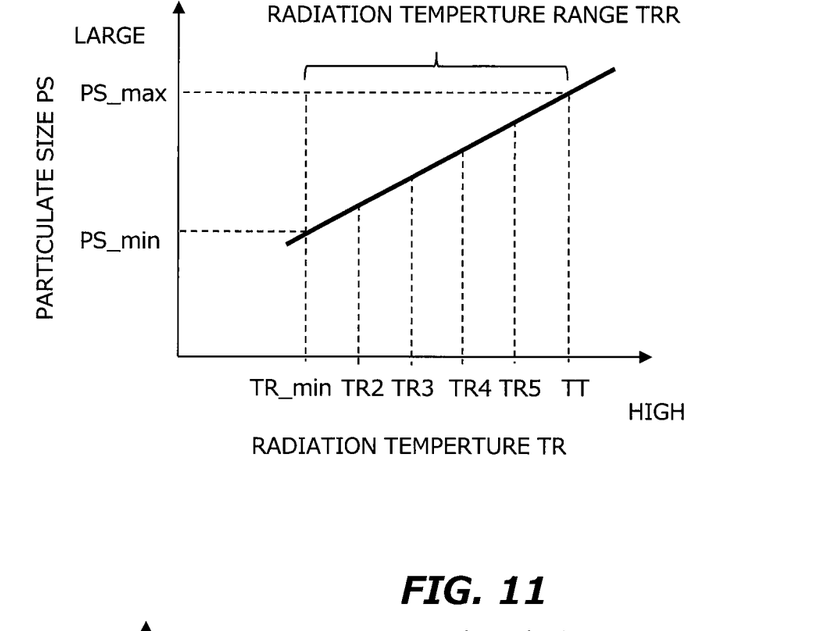
FIG. 11 is a diagram for describing a radiation temperature range TRR and a radiation temperature TRX.

Condition C21: the temperature THSM_D is in a radiation temperature range TRR Condition C22: the temperature THSM has raised above the absorption temperature TA in the most recent past backtracking from current time Condition C23: when the condition C22 is satisfied, the temperature THSM did not raise to cross the radiation temperature TRX from the time at which the temperature THSM raised above the absorption temperature TA to current time The radiation temperature range TRR and the radiation temperature TRX will be described with reference to FIG. 11. As shown in FIG. 11, the radiation temperature range TRR is a temperature range from minimum temperature TR_min to the target warm-up temperature TT. The minimum temperature TR_min is set to a temperature slightly higher than normal temperature (e.g., 35° C.). The target warm-up temperature TT varies depending on the subject for warm-up. Note that, as described with reference to FIG. 2, the radiation temperature TR rises in accordance with the particulate size PS.

The radiation temperature TRX is a temperature within the radiation temperature range TRR. The radiation temperature TRX is selected based on the temperature THSM_D. Specifically, the radiation temperature TRX is selected from candidates, within the radiation temperature range TRR, which is higher than the temperature THSM_D and has smallest in temperature difference with the temperature THSM_D. Temperatures TR2, TR3, TR4 and TR5 shown in FIG. 11 are the candidates for the radiation temperature TRX. For example, suppose that the temperature THSM_D is between the temperatures TR2 and TR3. In this case, the radiation temperature TRX falls into the temperature TR3. Suppose a case where that the temperature THSM_D is between the temperatures TR4 and TR5, the radiation temperature TRX falls into the temperature TR5.

If it is judged in the step S22 of FIG. 10 that the radiation condition C2 is satisfied, the heater 40 is started to operate (step S24). By operating the heater 40, the heat storage materials 10 are directly or indirectly heated. When the temperature THSM reaches the radiation temperature TRX, heat from the heat storage materials 10 is started to release.

Subsequent to the step S24, it is judged whether or not the temperature THSM is higher than the temperature (TRX+α) (step S26). The temperature a has already been explained. When the temperature THSM is higher than the temperature (TRX+α), it is estimated that heat from the heat storage materials 10 is started to release. Therefore, in this case, the operation of the heater 40 is stopped (step S28). Otherwise, the processing of the step S24 is executed to operate the heater 40.

2. Advantageous Effect by Warm-Up Acceleration Control

Figure 12:
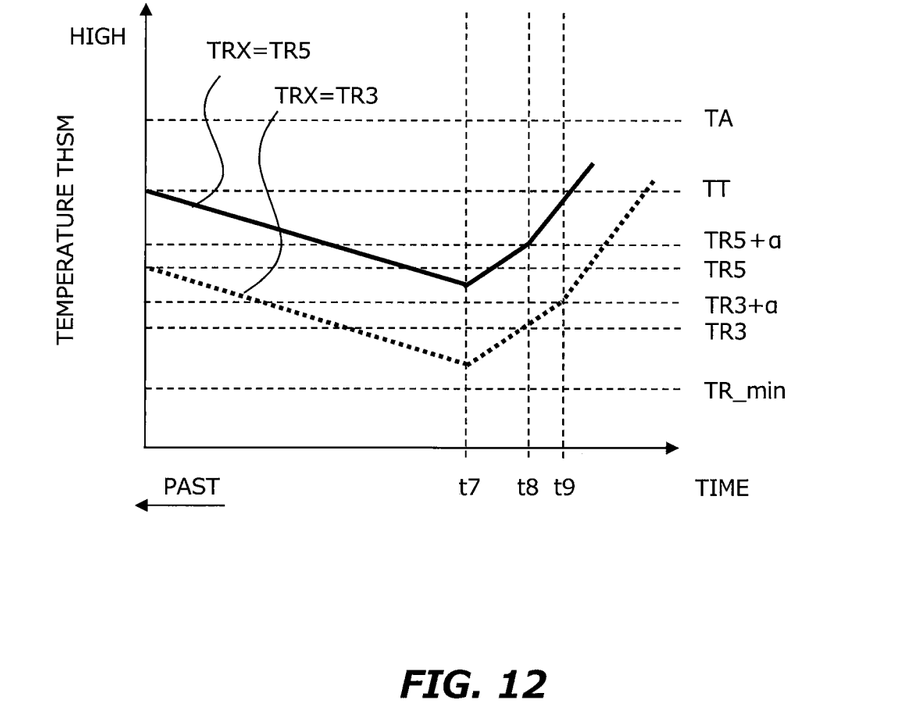
FIG. 12 is a diagram for describing advantageous effects of the warm-up acceleration control executed in the second embodiment.

FIG. 12 is a diagram for describing advantageous effects by warm-up acceleration control of the second embodiment. In FIG. 12, it is assumed that the radiation condition C2 was satisfied at time t7. The solid line in FIG. 12 shows change in the temperature THSM when the radiation temperature TRX falls into the temperature TR5. As indicated by this solid line, when the radiation temperature TRX falls into the temperature TR5, the heater 40 is the operated from time t7 to t8. The broken line in FIG. 12 shows change in the temperature THSM when the radiation temperature TRX falls into the temperature TR3. As indicated by this broken line, when the radiation temperature TRX falls into the temperature TR3, the heater 40 is the operated from time t7 to t9.

In either case of the solid and broken lines, it is possible to raise the temperature THSM in a short time. Then, when the temperature THSM rises above the temperature (TRX+α), it is possible to raise the temperature of the subject for warm-up to the target warm-up temperature TT by utilizing the heat released from the heat storage materials 10. From the above, according to the warm-up acceleration control of the second embodiment, if the temperature THSM_D is within the radiation temperature range TRR, it is possible to obtain the same advantageous effect as that described in the first embodiment by setting the radiation temperature TRX in accordance with the temperature THSM_D. In other words, regardless of the temperature of the temperature THSM_D, it is possible to apply the heat released from heat storage materials 10 to the subject for warm-up effectively.

Third Embodiment

Next, a third embodiment of the present disclosure will be described with reference to FIG. 13. The configuration of the system according to the third embodiment is common to that of the system described in the first embodiment. Therefore, the configuration example of the system will be omitted to describe.

1. Features of Control in Third Embodiment

In the first embodiment, it is judged that the radiation condition C1 is not satisfied when the condition C12 (i.e., the temperature THSM has raised above an absorption temperature TA in the most recent past backtracking from current time) is not satisfied. Also, in the second embodiment, the judgement processing is executed with the condition C22 which is the same in content as the condition C12.

Here, the temperature THSM_D (i.e., the temperature THSM at the judging processing of the radiation condition) is necessary for the execution of the judgment processing of the condition C11, whereas the judgment processing of the condition C12 does not require the temperature THSM_D. In other words, the judgement processing of the condition C12 is able to execute with the history of the temperature THSM. Therefore, it can be understood the judgment processing of the condition C12 or C22 (hereinafter collectively referred to as an "absorption condition") is able to execute before that of the remaining conditions C11 and C13 (or conditions C21 and C23).

Here, it is expected that the request for warm-up is issued when the temperature of the subject for warm-up is lowered. Also, it is expected that the temperature of the subject for warm-up will be drop after a certain period has elapsed after the operation stop of the subject for warm-up. Based on these expectations, in the third embodiment, judgment processing of the absorption condition is executed at the operation stop of the subject for warm-up.

If the judgment processing of the absorption condition is completed at the operation stop of the subject for warm-up, it can be considered that execution period for judging of the radiation condition is shortened. However, if it is judged that the absorption condition is not satisfied at the operation stop of the subject for warm-up, it will be unable to utilize the properties of AMP at all.

Therefore, in the third embodiment, if judgment result of the absorption condition is negative at the operation stop of the subject for warm-up, the heater 40 is forcefully operated until the temperature of the heat storage materials 10 exceeds the absorption temperature TA. If the subject for warm-up is the engine main body or the exhaust catalyst, the engine may be operated forcibly so that the heat storage materials 10 absorbs the heat therefrom.

Figure 13:
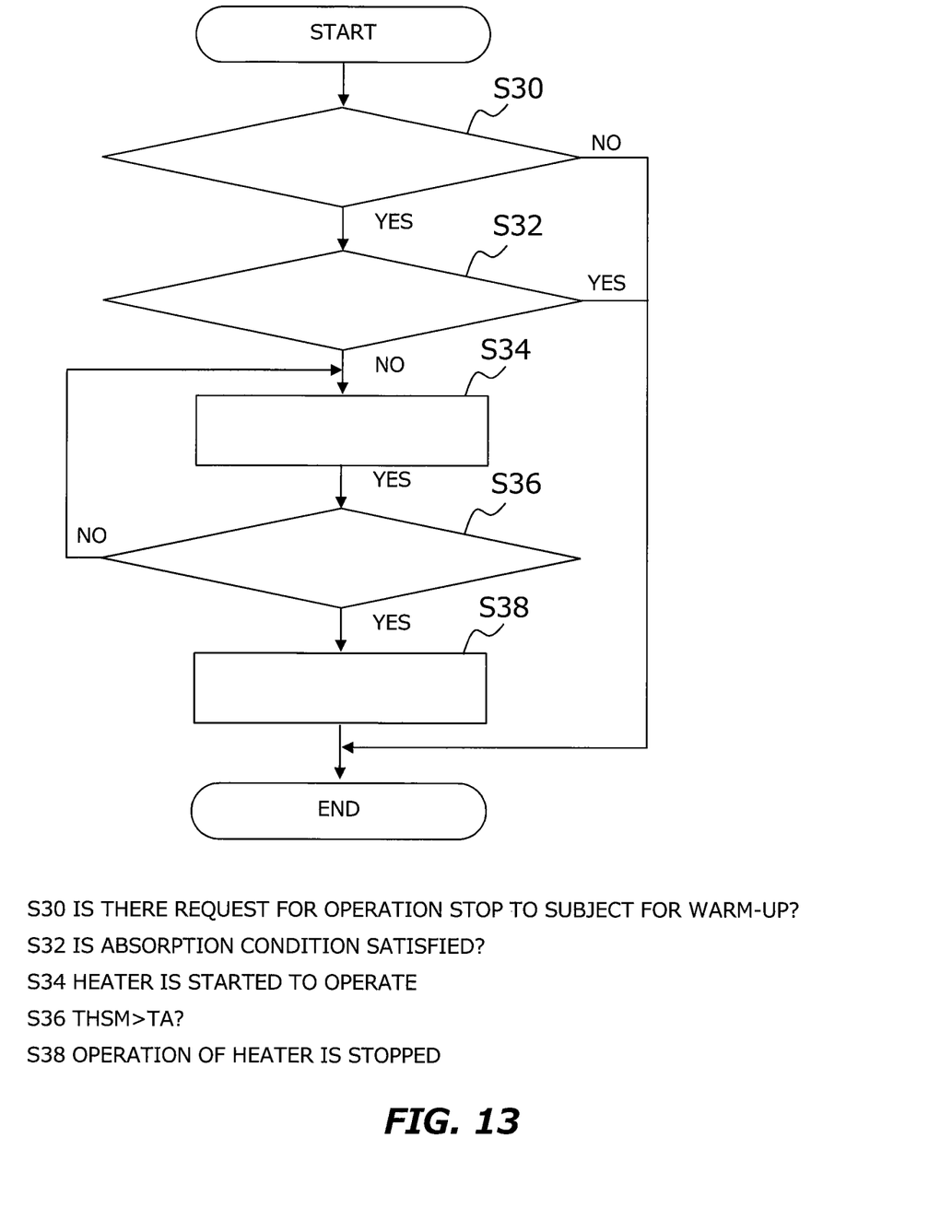
FIG. 13 is a flowchart for describing processing flow executed by the controller in a third embodiment of the present disclosure.

FIG. 13 is a flowchart for describing processing flow executed by the controller 50 in the third embodiment. The processing routine shown in FIG. 13 is executed repeatedly at a predetermined control cycle during the controller 50 is at work.

In the routine shown in FIG. 13, first, it is judged whether or not there is a request for operation stop to the subject for warm-up (step S30). Whether or not there is the request for operation stop is judged according to the type of the subject for warm-up. For example, if the subject for warm-up is the engine main body or the exhaust catalyst, the judgement processing of the step S30 is executed based on whether or not there is the request for operation stop to the engine main body. If the subject for warm-up is the battery, the judgement processing of the step S30 is executed based on whether or not there is the request for operation stop to the entire system including the warm-up system for vehicle.

If it is judged in the step S30 that there is the request for operation stop, it is judged whether or not the absorption condition is satisfied (step S32). The judgement processing in the step S32 is executed based on the latest history of the temperature THSM. If it is judged that the absorption condition is satisfied, the processing routine is ended.

When it is judged that the absorption condition is not satisfied, the heater 40 is started to operate (step S34). By operating the heater 40, the heat storage materials 10 are directly or indirectly heated.

Subsequent to the step S34, it is judged whether or not the temperature THSM is higher than the absorption temperature TA (step S36). When the temperature THSM is higher than the absorption temperature TA, it is expected that heat has been absorbed by the heat storage materials 10. Therefore, in this case, the operation of the heater 40 is stopped (step S38). Otherwise, the processing of the step S34 is executed to operate the heater 40.

2. Advantageous Effect by Control of Third Embodiment

According to the control executed in the third embodiment, it is possible to establish the absorption condition at the operation stop of the subject for warm-up. Therefore, if the request for warm-up is issued in the future, it is possible to judge that the absorption condition is satisfied with a high probability. Therefore, when the remaining conditions C11 and C13 (or C21 and C23) are satisfied, it is possible to apply the heat released from heat storage materials 10 to the subject for warm-up effectively.

OTHER EMBODIMENTS

The warm-up system for vehicle according to the above embodiments may be modified as follows.

In the warm-up acceleration control of the first embodiment, the operation of the heater 40 is stopped when the temperature THSM is higher than the temperature (TR1+α). In addition, in the warm-up acceleration control of the second embodiment, the operation of the heater 40 is stopped when the temperature THSM is higher than the temperature (TRX+α). However, the operation of the heater 40 may not be stopped but continued until the temperature THSM reaches the target warm-up temperature TT.

What is claimed is:

1. A warm-up system for vehicle comprising:
a heat storage material which is arranged to exchange heat with a subject for warm-up mounted on a vehicle;
a heater which is arranged to heat the heat storage material;
a temperature sensor which is configured to detect temperature of the heat storage material; and
a controller which is configured to control operation of the heater,
wherein the heat storage material has properties:
to absorb heat when its temperature exceeds a preset absorption temperature;
to release the absorbed heat when its temperature rises; and
to keep a solid state upon the heat absorption and release,
wherein the controller is further configured to:
when there is a request for warm-up to the subject for warm-up, based on temperature history and current temperature of the heat storage material, judge whether or not the heat storage material is in a heat release state;
operate the heater when it is judged that the heat storage material is in the heat release state; and
stop the operation of the heater after the start of the operation when the detected temperature rises higher than a radiation temperature at which the absorbed heat is started to release, and also lower than a target warm-up temperature of the subject for warm-up.

2. The warm-up system according to claim 1,
wherein the controller is further configured to not operate the heater when it is judged that the heat storage material is not in the heat release state.

3. The warm-up system according to claim 1,
wherein the heat storage material includes 2-Amino-2-Methyl-1, 3-Propanediol.

4. A warm-up system for vehicle comprising:
a heat storage material which is arranged to exchange heat with a subject for warm-up mounted on a vehicle;
a heater which is arranged to heat the heat storage material;
a temperature sensor which is configured to detect temperature of the heat storage material; and
a controller which is configured to control operation of the heater,
wherein the heat storage material has properties:
to absorb heat when its temperature exceeds a preset absorption temperature;
to release the absorbed heat when its temperature rises;
to keep a solid state upon the heat absorption and release; and
such that its radiation temperature at which the absorbed heat is started to release increases as its particulate size enlarges,
wherein the heat storage material includes a plurality of heat storage materials having different particulate sizes,
wherein the controller is further configured to:
when there is a request for warm-up to the subject for warm-up, based on temperature history and current temperature of the heat storage material, judge whether or not the heat storage material is in a heat release state;
upon the judgement whether or not the heat storage material is in the heat release state, select the radiation temperature which is higher than the detected temperature and also has smallest in temperature difference with the detected temperature from candidates of the radiation temperatures which are preset in accordance with the particulate sizes; and
when it is judged that the heat storage material is in the heat release state, operate the heater until the detected temperature exceeds the selected radiation temperature.

5. The warm-up system according to claim 4,
wherein the controller is further configured to not operate the heater when it is judged that the heat storage material is not in the heat release state.

6. The warm-up system according to claim 4,
wherein the heat storage material includes 2-Amino-2-Methyl-1, 3-Propanediol.

7. A warm-up system for vehicle comprising:
a heat storage material which is arranged to exchange heat with a subject for warm-up mounted on a vehicle;
a heater which is arranged to heat the heat storage material;
a temperature sensor which is configured to detect temperature of the heat storage material; and
a controller which is configured to control operation of the heater,
wherein the heat storage material has properties:
to absorb heat when its temperature exceeds a preset absorption temperature;
to release the absorbed heat when its temperature rises; and
to keep a solid state upon the heat absorption and release,
wherein the controller is further configured to:
when there is a request for warm-up to the subject for warm-up, based on temperature history and current temperature of the heat storage material, judge whether or not the heat storage material is in a heat release state;

judge that the heat storage material is in the heat release state when a preset radiation condition is satisfied, wherein the radiation condition includes an absorption condition which is satisfied when temperature data exceeding the absorption temperature is included in history of the detected temperature;

operate the heater when it is judged that the heat storage material is in the heat release state;

when there is a request for operation stop to the subject for warm-up, judge whether or not the absorption condition is satisfied based on the history of the detected temperature; and when it is judged that the absorption condition is not satisfied, operate the heater until the detected temperature exceeds the absorption temperature.

8. The warm-up system according to claim 7, wherein the controller is further configured to not operate the heater when it is judged that the heat storage material is not in the heat release state.

9. The warm-up system according to claim 7, wherein the heat storage material includes 2-Amino-2-Methyl-1, 3-Propanediol.

* * * * *